(12) United States Patent
Yuan et al.

(10) Patent No.: US 11,281,445 B2
(45) Date of Patent: Mar. 22, 2022

(54) METHOD, APPARATUS, DEVICE AND STORAGE MEDIUM FOR UPGRADING APPLICATION

(71) Applicant: BEIJING BAIDU NETCOM SCIENCE AND TECHNOLOGY CO., LTD., Beijing (CN)

(72) Inventors: Linsi Yuan, Beijing (CN); Yingming Mao, Beijing (CN); Li Wang, Beijing (CN); Yu Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 19 days.

(21) Appl. No.: 16/710,511

(22) Filed: Dec. 11, 2019

(65) Prior Publication Data

US 2020/0401392 A1    Dec. 24, 2020

(30) Foreign Application Priority Data

Jun. 21, 2019  (CN) .......................... 201910544728.3

(51) Int. Cl.
*G06F 9/445*     (2018.01)
*G06F 8/65*      (2018.01)

(52) U.S. Cl.
CPC ............ *G06F 8/65* (2013.01); *G06F 9/44521* (2013.01)

(58) Field of Classification Search
CPC .............................. G06F 8/65; G06F 9/44521
USPC ................................................. 717/168–178
See application file for complete search history.

(56) References Cited

U.S. PATENT DOCUMENTS

2015/0135200 A1* 5/2015 Pajuelo Gonzalez ....................... G06F 9/5077
719/328
2019/0361756 A1* 11/2019 Xia ........................ G06F 3/0414

FOREIGN PATENT DOCUMENTS

| JP | H06110678  | 4/1994  |
|----|------------|---------|
| JP | 2006268172 | 10/2006 |
| JP | 2013041546 | 2/2013  |
| JP | 5341968    | 11/2013 |
| JP | 2015041273 | 3/2015  |

(Continued)

OTHER PUBLICATIONS

Horiuchi, Nonstop update of running robot controller programs, Journal of Robotics Society of Japan 22(7)910-915 (2004).

*Primary Examiner* — Chuck O Kendall
(74) *Attorney, Agent, or Firm* — Knobbe, Martens, Olson & Bear LLP (57) ABSTRACT

Embodiments of the present disclosure relate to the field of cloud computing, and specifically to a method, apparatus, device, and computer storage medium for upgrading an application. The method may include: determining, for a first thread executed by a first process of a first application, a first function invoked by the first thread; determining a second function corresponding to the first function in a second application, the first application to be upgraded to the second application, and the first function to be upgraded to the second function; replacing a first dynamic link library of the first application comprising the first function based on a second dynamic link library of the second application comprising the second function; and updating the first process based on the second dynamic link library, such that the updated first process runs the second function in the second application.

21 Claims, 9 Drawing Sheets

(56) References Cited

FOREIGN PATENT DOCUMENTS

| KR | 20190035686 | 4/2019 |
|---|---|---|
| WO | WO2018159691 | 9/2018 |

\* cited by examiner

METHOD, APPARATUS, DEVICE AND STORAGE MEDIUM FOR UPGRADING APPLICATION

CROSS-REFERENCE TO RELATED APPLICATION

This application claims priority to Chinese Application No. 201910544728.3, filed on Jun. 21, 2019 and entitled "Method, Apparatus, Device and Storage Medium for Upgrading Application," the entire disclosure of which is hereby incorporated by reference.

TECHNICAL FIELD

Embodiments of the present disclosure generally relate to application version management, and more specifically to a method, apparatus, device, and computer storage medium for managing application version upgrading.

BACKGROUND

With the development of software development technology, applications providing a plurality of functions have emerged at present. During the operation of the application, for the purpose of correcting errors, providing new functions, or the like, versions of the application may often be upgraded. In this case, the application version upgrading may interrupt normal operation of the application. For example, for the application to be accessed by a large number of users at any moment, such as a web server management application, or a virtual machine management application, interrupting application operation to perform the version upgrading may seriously affect the normal operations of the users. In this case, how to more efficiently manage the application version upgrading becomes a technical problem.

SUMMARY

According to embodiments of the present disclosure, a solution of upgrading an application is provided.

In a first aspect, an embodiment of the present disclosure provides a method for upgrading an application. The method includes: determining, for a first thread executed by a first process of a first application, a first function invoked by the first thread; determining a second function corresponding to the first function in a second application, the first application to be upgraded to the second application, and the first function to be upgraded to the second function; replacing a first dynamic link library of the first application including the first function based on a second dynamic link library of the second application including the second function; and updating the first process based on the second dynamic link library, such that the updated first process runs the second function in the second application.

In a second aspect, an embodiment of the present disclosure provides an apparatus for upgrading an application. The apparatus includes: a first determining module configured to determine, for a first thread executed by a first process of a first application, a first function invoked by the first thread; a second determining module configured to determine a second function corresponding to the first function in a second application, the first application to be upgraded to the second application, and the first function to be upgraded to the second function; a replacing module configured to replace a first dynamic link library of the first application including the first function based on a second dynamic link library of the second application including the second function; and an updating module configured to update the first process based on the second dynamic link library, such that the updated first process runs the second function in the second application.

In a third aspect, an embodiment of the present disclosure provides a device for upgrading an application. The device includes: one or more processors; and a storage apparatus, for storing one or more programs, where the one or more programs, when executed by the one or more processors, cause the one or more processors to implement the method according to the first aspect.

In a fourth aspect, an embodiment of the present disclosure provides a computer readable medium, storing a computer program thereon, where the computer program, when executed by a processor, implements the method according to the first aspect.

It should be appreciated that the description of the Summary is not intended to limit the key or important features of embodiments of the present disclosure, or to limit the scope of the present disclosure. Other features of the present disclosure will become readily comprehensible through the following description.

BRIEF DESCRIPTION OF THE DRAWINGS

With reference to the accompanying drawings and the following detailed description, the above and other features, advantages and aspects of some embodiments of the present disclosure will become more apparent. In the accompanying drawings, the same or similar reference numerals indicate the same or similar elements.

DETAILED DESCRIPTION OF EMBODIMENTS

Embodiments of the present disclosure will be further described below in detail with reference to the accompanying drawings. Although certain embodiments of the present disclosure are shown in the accompanying drawings, it may be understood that the present disclosure may be implemented in various forms and should not be construed as limited to embodiments set forth herein. On the contrary, embodiments are provided to provide a more comprehensive and complete understanding of the present disclosure. It may be appreciated that the accompanying drawings and embodiments of the present disclosure are for illustrative purposes only and are not intended to limit the scope of the present disclosure.

In the description of embodiments of the present disclosure, the term "comprises" and the like are to be understood as open-ended, i.e., "including but not limited to". The term "based on" should be understood as "based at least in part." The term "one embodiment" or "an embodiment" should be understood as "at least one embodiment." The terms "first," "second," and the like may refer to different or identical objects. Other explicit and implicit definitions may also be included below.

Figure 1:
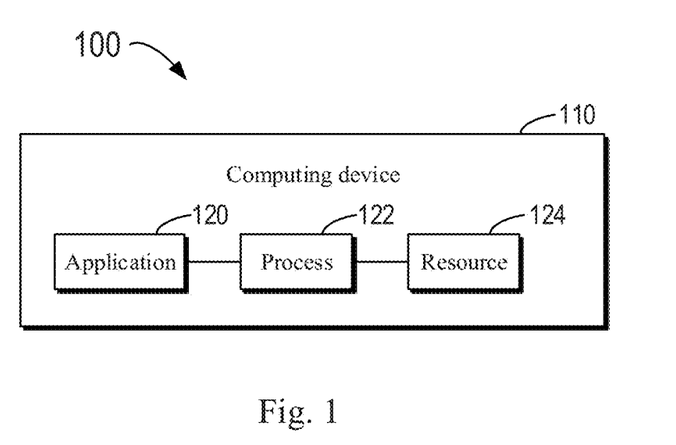
FIG. 1 schematically shows a block diagram of an application environment in which embodiments of the present disclosure may be implemented.

Hereinafter, an application environment of the present disclosure is first described with reference to FIG. 1. FIG. 1 schematically shows a block diagram of an application environment 100 in which embodiments of the present disclosure may be implemented. As shown in FIG. 1, an application 120 may run on a computing device 110. The application 120 here may be an application program for executing various functions. For example, the application 120 may be a management application for providing network virtualization management in a virtualization scenario, may be a server management application for managing a Web server, or may be an application for monitoring a running state of the computing device 110, or the like. During the running of the application 120, the application 120 may start a process 122, and may allocate a resource 124 to the process 122.

In summary, the process 122 is an example of a running application 120, and the process 122 may have its own resource 124 (e.g., a text area, a data area, and a stack). During the running of the application 120, the process 122 may access various contents in the resource 124, to achieve functions of the application 120. It will be appreciated that the resource 124 is present along with running of the process 122, and when the process 122 is terminated, the resource 124 will be released.

For reasons of adding a new function, fixing an error in the existing application 120, improving the running efficiency, and the like, the application 120 may often be upgraded. In this case, how to minimize interruption time of the application 120 becomes crucial, especially for applications requested to run in 24 hours without interruption. For the ease of description, example implementations of the present disclosure will be described merely with a network virtualization management application as an example in the context of the present disclosure. For example, openvswitch may provide support for network virtualization in the virtualization scenario. There are two modes in actual deployment: in an ovs-kernel mode, the processing is completed by an operating system; in an ovs-dpdk mode, the processing is switched from a kernel state to a user state.

For a network virtualization application, a plurality of upgrading solutions has been proposed at present. In a technical solution, upgrading is implemented by pre-deploying a component of a new version, and restarting an ovs-vswitchd process. This solution may be applied to both ovs-kernel and ovs-dpdk modes. However, the upgrading solution may result in long interruption time of the application, and network disconnection time may reach a minute level. In addition, an upgrading operation result is unexpectable.

In another technical solution, the ovs-vswitchd process is split into a main daemon and an secondary daemon. The main daemon is responsible for managing static resources, and the secondary daemon is responsible for data processing. The main daemon and the secondary daemon share storage resources. During upgrading, merely the secondary daemon is restarted, and it is no longer necessary to apply for memory in a start-up process, thereby shortening restart time of the process, and then reducing the application interruption time caused by an upgrading operation. However, this technical solution can only be applied to the ovs-dpdk mode, and the application interruption time is still less ideal.

In still another technical solution, a new ovs-vswitchd process is started during upgrading, and the new process may occupy the same amount of resources as the original process. This technical solution can further reduce the interruption time. However, since the solution needs to occupy a lot of resources and can only be applied to the ovs-dpdk mode, it is unable to provide a universal technical solution of upgrading.

In order to at least partially solve the defects in the above technical solutions, a technical solution of updating an application in a computing device is provided according to embodiments of the present disclosure. In the technical solution, the application process is not restarted, but a thread of the application is merely restarted. It will be appreciated that the thread is the smallest unit that can be scheduled by the computing device. A process may include one or more threads, and the one or more threads can share all resources in the process. Only restarting the thread will not result in release of resources allocated to the process, thus avoiding the time cost of the resource recovery process. Further, a dynamic link library of the application may be replaced, and an address of a function in the dynamic link library is invoked, thus greatly reducing the application interruption time caused by the upgrading process. Hereinafter, more details of an embodiment of the present disclosure will be described respectively with reference to FIG. 2A and FIG. 2B.

Figure 2A:
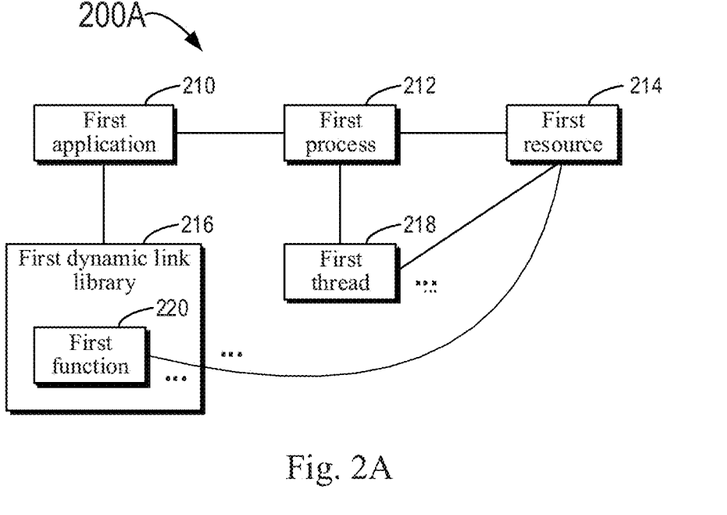
FIG. 2A schematically shows a block diagram of a first application before executing upgrading according to an embodiment of the present disclosure.

FIG. 2A schematically shows a block diagram 200A of a first application before executing upgrading according to an embodiment of the present disclosure. The first application 210 may invoke one or more dynamic link libraries. While FIG. 2A only schematically shows a first dynamic link library 216, the first application 210 may further invoke more dynamic link libraries. Further, although the first dynamic link library 216 is shown to include a first function 220, the first dynamic link library 216 may further include one or more other functions. When running the first application 210, the first application 210 may start the first process 212. A first resource 214 may be allocated to the first process 212, and the first process 212 may execute one or more threads (e.g., a first thread 218). Here, the first thread 218 may invoke a first function 220 via an address of the first function 220 recorded in the first resource 214.

Figure 2B:
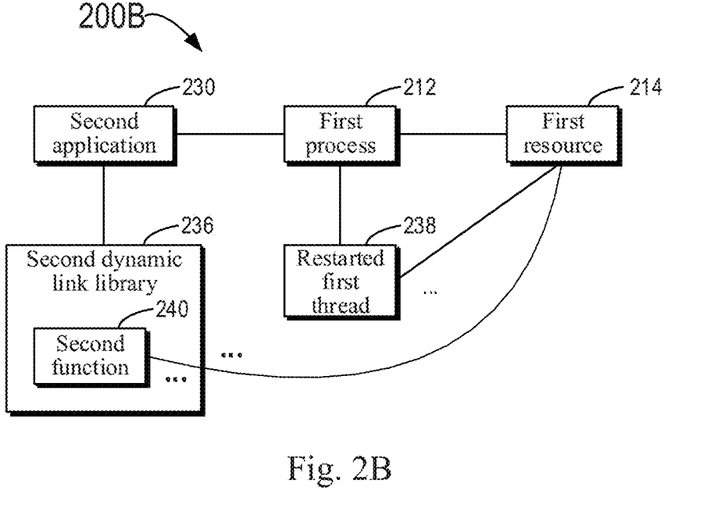
FIG. 2B schematically shows a block diagram of a second application after executing upgrading according to an embodiment of the present disclosure.

As shown in FIG. 2A, the first application 210 here may be an application of an old version, and it is desirable to upgrade the first application 210 to a second application 230 of a new version shown in FIG. 2B. FIG. 2B schematically shows a block diagram 200B of a second application after executing upgrading according to an embodiment of the present disclosure. It will be appreciated that, the second application 230 may invoke a second dynamic link library 236 including a second function 240. The second function 240 here is an upgraded function corresponding to the first function 220, and the second dynamic link library 236 is an upgraded dynamic link library corresponding to the first dynamic link library 216. In order to execute the upgrading process, it is not necessary to restart the first process 212, but only necessary to restart the first thread 218, the first dynamic link library 216 is replaced with the second dynamic link library 236, and a first address originally pointing to the first function 220 in the first resource 214 is modified to a second address pointing to the second function 240. In this case, the restarted first thread 238 may invoke the second function 240 of the new version. Therefore, the upgrading process may be implemented more simply and effectively. Hereinafter, more details of an embodiment of the present disclosure will be described with reference to FIG. 3.

Figure 3:
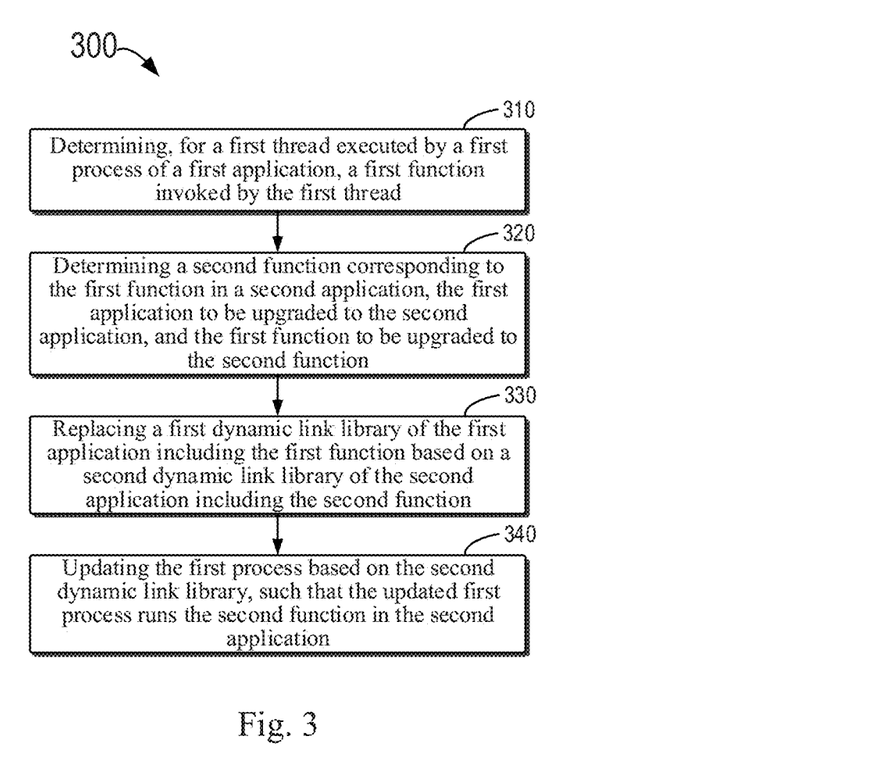
FIG. 3 schematically shows a flowchart of a method for upgrading an application according to an embodiment of the present disclosure.

FIG. 3 schematically shows a flowchart of a method 300 for upgrading an application according to an embodiment of the present disclosure. As show in FIG. 3, block 310 includes determining, for the first thread 218 executed by the first process 212 of the first application 210, the first function 220 invoked by the first thread 218. It will be appreciated that, while block 310 merely relates to processing of the first function 220, the first process 212 of the first application 210 may further execute a plurality of threads, and each thread of the plurality of threads may invoke one or more functions. In this case, the method 300 may be performed respectively for each function.

The first function 220 may be determined by various approaches. For example, the first function 220 may be determined by analyzing an executable file of the first application 210. For another example, the first function 220 may be also determined by analyzing a source code of the first application 210. The first function 220 here may be stored in the first dynamic link library 216 of the first application 210. Assuming that a function name of the first function 220 is determined to be "A," then processing may be performed for the function "A" in a subsequent operation.

Block 320 includes determining a second function 240 corresponding to the first function 220 in the second application 230. The first application 210 here refers to an application of an old version, and the second application 230 refers to an application of a new version. In this case, the first function 220 may be upgraded to the second function 240. In the case where the function name of the first function 220 is "A," a function name of the second function 240 determined here, for example, may be "A'." The function A' of a new version here may be stored in the second dynamic link library 236 of the second application 230.

Block 330 may include replacing the first dynamic link library 216 of the first application 210 including the first function 220 based on a second dynamic link library 236 of the second application 230 including the second function 240. Since one or more dynamic link libraries invoked by the second application 230 may be easily obtained, the application upgrading can be achieved more conveniently and efficiently by replacing the dynamic link library of each old version with a dynamic link library of a new version one by one.

Block 340 includes updating the first process 212 based on the second dynamic link library 236, such that the updated first process runs the second function 240 in the second application 230. Specifically, the updating may include two aspects: (1) updating an address pointing to the invoked function in the first resource 214; and (2) synchronizing, in response to the first application 210 relating to variables to which a space is allocated during compilation, numerical values of these variables to corresponding variables in the second application 230. Hereinafter, how to update address mapping will be first described with reference to FIG. 4.

Figure 4:
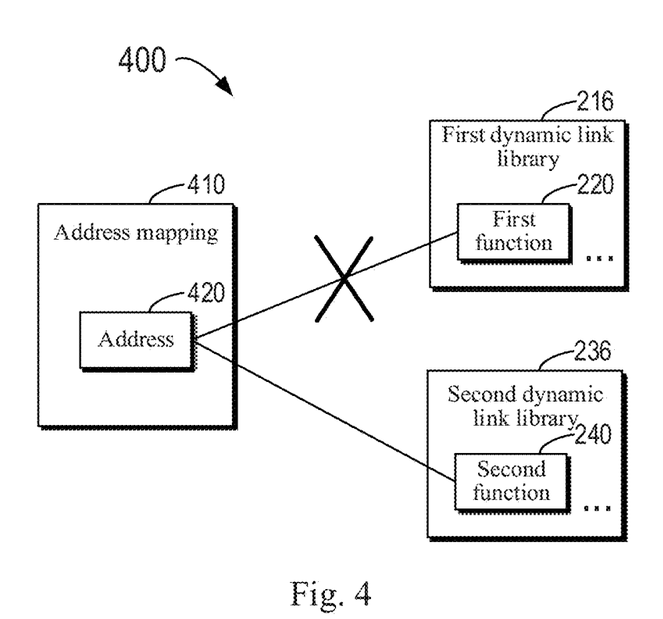
FIG. 4 schematically shows a block diagram of address mapping associated with the first application according to an embodiment of the present disclosure.

FIG. 4 schematically shows a block diagram 400 of address mapping 410 associated with the first application 210 according to an embodiment of the present disclosure. During the running of the first application 210, the first resource 214 may be allocated to the first process 212 of the first application 210, and the first resource 214 may include the address mapping 410 shown in FIG. 4. The address mapping 410 may include an address of a function invoked by one or more threads executed by the first process 212. As shown in FIG. 4, the address mapping 410 may include an address 420. Before executing upgrading, the address 420 points to the first function 220 in the first dynamic link library 216. After executing the upgrading, the address 420 needs to be modified to pointing to the second function 240 in the second dynamic link library 236.

According to an embodiment of the present disclosure, it is not necessary to restart the first process 212. Therefore, the first resource 214 is always present during the upgrading. The address mapping 410 of the first process 212 may be first acquired from the first resource 214. Here, the address mapping 410 includes a first address of the first function 220 in an address space of the first process 212. It will be appreciated that the address space here refers to a range of addresses that may be accessed by the first process 212. When running the first application 210, the first function 220 is loaded into the address space, and the first function 220 may be invoked by referring to the first address of the first function 220 in the address space.

In order to update the address 420 in the address mapping 410, the first address of the first function 220 in the address mapping 410 may be replaced with a second address of the second function 240. In other words, the address 420 may be modified from pointing to the first function 220 to pointing to the second function 240. Then, the first thread 218 may be restarted, such that the restarted first thread 238 invokes the second function 240 in the second dynamic link library 236 based on the updated address mapping. In this case, the restarted first thread 238 may invoke the second function 240 based on the updated address 420. It will be appreciated that, various overheads of restarting the thread is much lower than overhead of the restarting the process, and thus restarting the thread may be completed within a short time interval (e.g., less than an order of magnitude of millisecond). In this case, since a pointer of the address 420 has been modified to pointing to the second function 240, the restarted first thread 238 may immediately invoke the second function 240, and execute the functions defined by the function A' of the new version.

Figure 5:
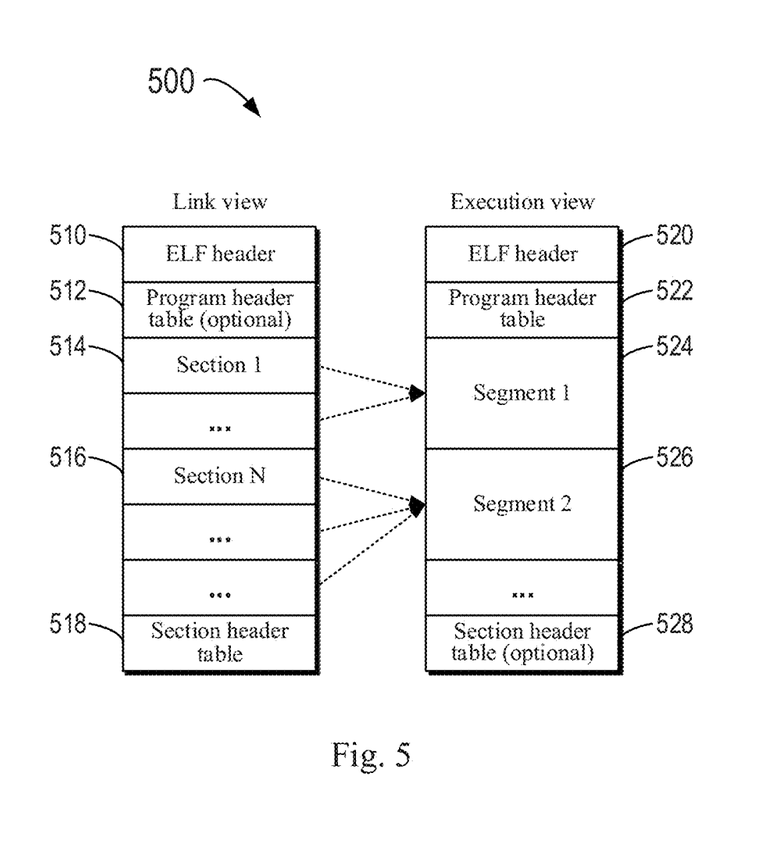
FIG. 5 schematically shows a block diagram of an executable file associated with the first application according to an embodiment of the present disclosure.

According to an embodiment of the present disclosure, a first name and the first address of the first function 220 may be acquired respectively based on the executable file of the first application 210. Hereinafter, a structure related to the executable file will be described with reference to FIG. 5. Specifically, FIG. 5 schematically shows a block diagram 500 of an executable file associated with the first application 210 according to an embodiment of the present disclosure. The left side of FIG. 5 shows a link view of the structure of the executable file. The link view represents a schematic data structure of the executable file in a link state. The executable file, for example, may be stored in an ELF (executable and linkable format). As show in FIG. 5, the link view may include an ELF header 510, a program header table (optional) 512, a plurality of sections, and a section header table 518. In FIG. 5, the plurality of sections, for example, may include a section 1 514, . . . , a section N 516, and the like. Specifically, each section may store data corresponding to different functions of the executable file.

The right side of FIG. 5 shows a data structure of an execution view of the executable file, which represents a data structure when the executable file is running and is loaded into the computing device to be executed. The execution view may include an ELF header 520, a program header table 522, a plurality of segments (e.g., a segment 1 524, and a segment 2 526), and a section header table (optional) 528. As show in FIG. 5, each section in the link view may correspond to an segment in the execution view. According to an embodiment of the present disclosure, the function name and the corresponding first address of the first function 220 may be determined by querying data in each section of the link view.

According to an embodiment of the present disclosure, a section ".rel.plt" of the executable file stores relocation information, and each relocation item may be represented using the data structure shown in Table 1 below:

TABLE 1

Information of Relocation Items

| typedef struct { | |
|---|---|
| ELF64_Addr | r_offset; |
| ELF64_Word | r_info; |
| } ELF64_Rel; | |

As shown in Table 1, a variable "r_offset" represents an offset of a relocation item relative to a base address. A variable "r_info" includes two parts: an index of the relocation item in a section ".dynsym" and a type of the relocation item. For example, the index of the relocation item in the section ".dynsym" may be acquired by using a macro ELF64_R_SYM, and the type of the relocation item may be acquired by using a macro ELF64_R_TYPE. Further, the section ".dynsym" of the executable file may include definitions storing all relocations or relocation items and information required when being referred. A relocation item may correspond to a data structure shown in Table 2 below.

TABLE 2

Relocation Information

| typedef struct ELF64_sym{ | |
|---|---|
| ELF64_Word | st_name; |
| ELF64_Addr | st_value; |
| ELF64_Word | st_size; |
| unsigned char | st_info; |
| unsigned char | st_other; |
| ELF64_Half | st_shndx; |
| } ELF64_Sym; | |

In Table 2, "st_name" includes an index pointing to a symbol table and a string table (i.e., a section ".dynstr"). The index may be used to obtain a symbol name, and then obtain a function name corresponding to an offset address "offset." It will be appreciated that while a specific implementation of the method 300 of the present disclosure is described with ELF64 data structure in a 64-bit operating system as an example in the context of the present disclosure, the method 300 may also be implemented, for example, in a 32-bit system, and in this case, data may be stored using a data structure of ELF32 format. Hereinafter, an association relationship between the offset address and the function name of a function will be described with reference to FIG. 6.

Figure 6:
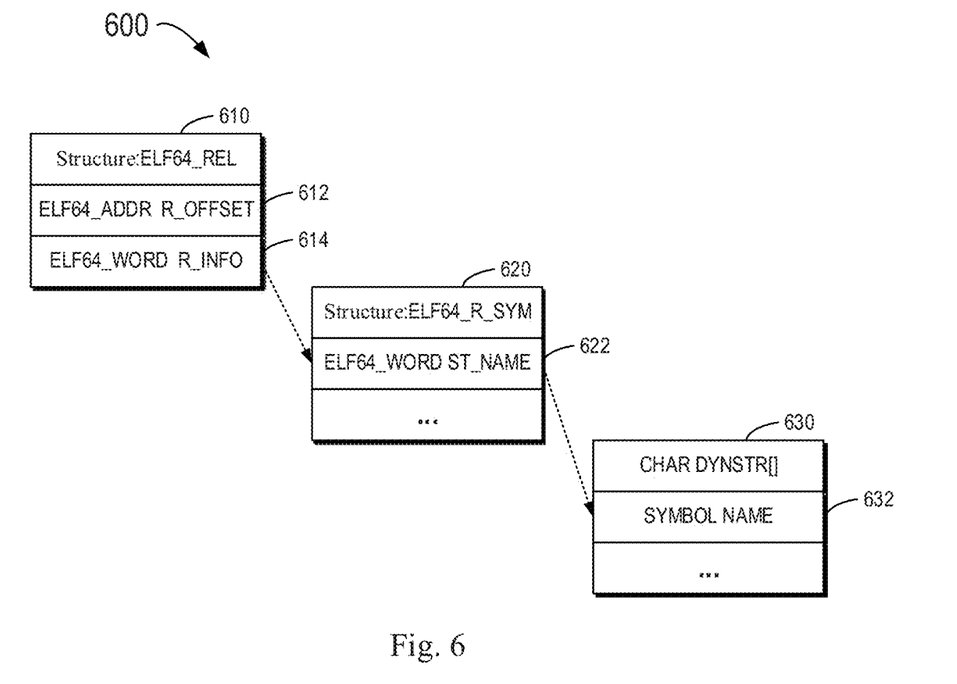
FIG. 6 schematically shows a block diagram of an association relationship between a function address and a function name determined based on data in a plurality of sections of the executable file according to an embodiment of the present disclosure.

FIG. 6 schematically shows a block diagram 600 of an association relationship between a function address and a function name determined based on data in a plurality of sections of the executable file according to an embodiment of the present disclosure. As shown in FIG. 6, an offset address 612 and information 614 related to a relocation item may be acquired respectively from a section 610 (i.e., a section ".rel.plt") of the first application 210. An index 620 of the relocation item in a section ".dynsym" may be acquired by using a macro ELF64_R_SYM. Then, a symbol name definition 622 corresponding to the offset address 612 may be obtained based on the index 620, then a corresponding symbol table 630 may be found, and a corresponding symbol name 632 may be obtained.

According to an embodiment of the present disclosure, all relocation items in the section ".rel.plt" may be traversed, and ELF64_Rel data structure corresponding to each read relocation item may be determined by the above approach described with reference to FIG. 6. Then, a corresponding index may be read from a field "r_info" in the ELF64_Rel using the macro ELF64_R_SYM, corresponding symbol information may be found in the section ".dynsym" using the index, and then a string defined by a field "st_name" may be found.

According to an embodiment of the present disclosure, for a given address of a group of addresses included in the first executable file of the first application 210, a function name associated with the given address is acquired; and in response to determining the function name matching the first function, the given address is identified as the first address. By this approach, a function name corresponding to a relocation item may be obtained. Specifically, assuming that an address offset of a relocation item is 0x000 . . . 000, and the function name found through the relocation item is "A," then the first address of the first function 220 with the function name "A" may be determined as 0x000 . . . 000. Similarly, the association relationship between the name and address of other functions invoked by the first thread may be obtained. By this approach, all functions invoked by the first executable file of the first application 210 and corresponding addresses may be determined.

It will be appreciated that, how to obtain the first address of the first function 220 has been described above. Similarly, the second dynamic link library 236 may be first loaded into the address space, and the above process described with reference to FIG. 6 may be executed for the executable file of the second application 230, to obtain the second address of the second function 240 corresponding to the first function 220. By this approach, the second address of the second function 240 in the address space may be acquired based on the loaded second dynamic link library 236. Specifically, based on the executable file of the second application 230, assuming that an address offset of a relocation item is 0x010 . . . 000, and a function name found through the relocation item is "A'," then a second address of a second function with the function name "A'" may be determined as 0x010 . . . 000. Then, the first address stored in the address 420 of the address mapping 410 may be replaced with the second address 0x010 . . . 000.

How to update the address of the first function 220 invoked by the first thread 218 has been described above to achieve the purpose of version upgrading. In one or more dynamic link libraries of the first application 210, there may further be internal functions. The internal functions here refer to functions that are not directly invoked by the first application 210. The internal functions may be indirectly invoked by the first application 210. Therefore, it is further necessary to upgrade these internal functions. According to an embodiment of the present disclosure, a plurality of functions in the first dynamic link library 216 may be traversed, to execute processing similar to the method 300 for each internal function.

According to an embodiment of the present disclosure, a third function (e.g., function name "B") except for the first function 220 may be acquired from the first dynamic link library 216. Then, a third address of the third function in the address space may be acquired. Similarly, a fourth address of a fourth function (e.g., a function "B'") corresponding to the third function "B" in the second dynamic link library 236 in the address space may be acquired. The third address in the address mapping may be updated using the fourth address. In this case, the restarted first thread 238 may invoke the function B' of a new version based on the fourth address, thus achieving the purpose of upgrading.

Assuming that the first application 210 of an old version directly invokes the first function A, and the first function A invokes the third function B. The second application 230 of a new version directly invokes the second function A', and the second function A' invokes the third function B'. The first dynamic link library 216 may be replaced with the second dynamic link library 236 in accordance with the method described above. Further, in the address mapping 410, the first address of the first function A may be replaced with the second address of the second function A', and the third address of the third function B may be replaced with the fourth address of the fourth function B'. In this case, the restarted first thread 238 may invoke the function A' of the new version, and the function A' of the new version may invoke the function B' of the new version.

It will be appreciated that the specific operation of how to execute upgrading for each function in the first application 210 is described above only with the first function 220 as an example of a function directly invoked by the first application 210, and with the third function as an example of a function indirectly invoked by the first application 210. The first application 210 may further include more directly and indirectly invoked functions. In this case, relocation items in the section ".rel.plt" of the executable file of the first application 210 and the section ".rel.plt" of each dynamic link library of the first application 210 may be traversed respectively, to find address information corresponding to the function name of each function involved in the upgrading process. By replacing the dynamic link library and updating address information in the address mapping 410, the restarted first thread 238 invokes each function of a new version.

The specific implementation of how to cause the restarted first thread 238 to execute the second function 240 in the second application 230 based on the updated dynamic link library and the updated address mapping has been described above. It will be appreciated that, there may further be, e.g., global variables and static variables, in the first dynamic link library. A storage space of these variables is allocated during compilation, and numerical values of these variables may be modified during the running of the first application 210. Therefore, it is further necessary to store these modified variables, and synchronize numerical values of the modified variables to corresponding variables in the second dynamic link library 236. Only by this approach, can the numerical values of the global variables and the static variables in the restarted first thread 238 be ensured to be consistent with the numerical values of the global variables and the static variables in the first thread before restarting.

Figure 7:
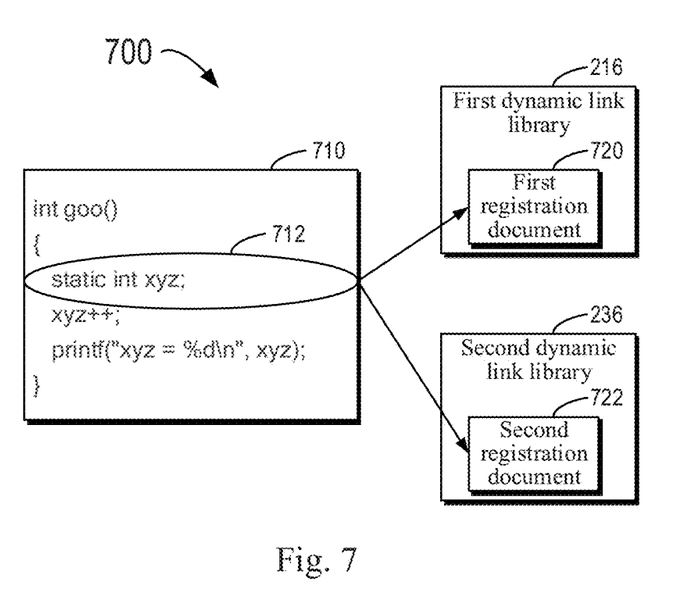
FIG. 7 schematically shows a block diagram of data of synchronization between variables in the first application and the second application based on a registration document according to an embodiment of the present disclosure.

According to an embodiment of the present disclosure, the updating the first process 212 based on the second dynamic link library 236 may further include a process of processing variables. Specifically, a first variable associated with the first dynamic link library 216 may be determined. An address of the first variable here is allocated during compilation of the first application. Hereinafter, more details of a process associated with synchronizing variables will be described with reference to FIG. 7. FIG. 7 schematically shows a block diagram 700 of executing synchronization between variables in the first application 210 and the second application 230 based on a registration document according to an embodiment of the present disclosure. As shown in FIG. 7, a code line 712 in a source code 710 of the first dynamic link library 216 defines a static variable xyz. In this case, a storage space for the static variable xyz may be allocated during compilation. The static variable xyz serves as a counter, and may execute an accumulating operation when a function goo ( ) is invoked each time.

It will be appreciated that, during the running of the first application 210, the function goo ( ) may be invoked a plurality of times, such that a numerical value of the static variable xyz has been modified (e.g., xyz=100) when executing an updating operation. To ensure synchronizing the numerical value xyz=100 to the second application 230, a second variable corresponding to the first variable in the second application 230 may be determined, and the second variable may be set based on the numerical value of the first variable. An embodiment of the present disclosure may be used to ensure synchronizing a numerical value of each variable in the first application 210 to a corresponding variable in the second application 230.

Specifically, in order to facilitate synchronizing variables between the first application 210 and the second application 230, a first registration document 720 may be added to the first dynamic link library 216, and a second registration document 722 may be added to the second dynamic link library 236. Here, the numerical value of the first variable included in the first registration document 210 is dynamically updated when the first thread 218 is running. In the above case where xyz=100, the first registration document 720 may include information of "xyz=100." Then, a numerical value of the second variable may be updated based on the numerical value of the first variable. In this case, the second registration document 722 may also include information of "xyz=100."

According to an embodiment of the present disclosure, the restarted first thread 238 may read the second variable from the second registration document 722, in order to achieve the purpose of synchronizing variables. In this case, the restarted first thread 238 may first read "xyz=100" from the second registration document 722, and a numerical value of a corresponding static variable xyz defined in the second dynamic link library 236 is set as 100. By this approach, the second application 230 may be restored to a state before the first thread is restarted.

It will be appreciated that, while the process of synchronizing variables is described above only with the static variable xyz as an example of a to-be-synchronized variable, according to an embodiment of the present disclosure, the first dynamic link library 216 may include one or more global variables and/or static variables. The operation may be performed similarly for each variable one by one. For example, an item corresponding to each to-be-synchronized variable may be inserted into the first registration document 720 and the second registration document 722, in order to achieve the synchronizing operation. An embodiment of the present disclosure may be used to simply and efficiently copy a numerical value of each static variable/global variable in the first application 210 of the old version to each corresponding static variable/global variable in the second application 230 of the new version based on the first registration document 720 and the second registration document 722.

The specific implementation for executing the upgrading has been described above. After the upgrading operation has been completed, data that are loaded into a memory of a computing device in the prior steps and are no longer used may be further eliminated. According to an embodiment of the present disclosure, in response to determining the first thread being restarted, a part of the first executable file loaded into a memory to determine the first address is eliminated from the memory of a computing device running the first application 210.

For example, in order to determine an association relationship between a function name and a function address, each data structure shown in FIG. 6 may be loaded into the memory of the computing device. After the association relationship has been determined, an address of a function of an old version in address mapping has been replaced with an address of a function of a new version, and the restarted first thread 238 has invoked the function of the new version based on the updated address mapping. In this case, loaded information about each section in the first dynamic link library 216 in the memory of the computing device may no longer be used, and thus a storage space of such information may be released.

According to an embodiment of the present disclosure, since hot upgrade is implemented by replacing the dynamic link library of the old version with the dynamic link library of the new version, the first application and the second application are required to be generated by dynamic compilation respectively. Further, core service logic of an application may be implemented in a dynamic link library, and a main program of the application may include an interface function for invoking a function in the dynamic link library. In this case, the first dynamic link library 216 and the second dynamic link library 236 include core service logics of the first application 210 and the second application 230 respectively, and then the purpose of application upgrading may be implemented by replacing a dynamic link library.

The specific process of upgrading from the first application 210 to the second application 230 has been described above, and according to an embodiment of the present disclosure, the second application 230 may be further upgraded to a third application of an updated version. In this case, the upgrading may be executed in accordance with the method described above, the second dynamic link library is replaced with a third dynamic link library of the third application, and an address of each function in the third application is used to update an address of a corresponding function in the second application.

Figure 8:
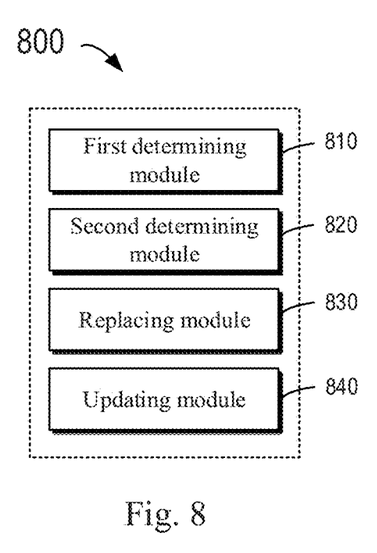
FIG. 8 schematically shows a block diagram of an apparatus for upgrading an application according to an embodiment of the present disclosure.

A plurality of implementations of the method 300 of how to execute application upgrading has been described above in detail. According to an embodiment of the present disclosure, an apparatus for executing application upgrading is further provided. Hereinafter, the apparatus will be described in detail with reference to FIG. 8. FIG. 8 schematically shows a block diagram of an apparatus 800 for upgrading an application according to an embodiment of the present disclosure. As show in FIG. 8, the apparatus 800 includes: a first determining module 810 configured to determine, for a first thread executed by a first process of a first application, a first function invoked by the first thread; a second determining module 820 configured to determine a second function corresponding to the first function in a second application, the first application to be upgraded to the second application, and the first function to be upgraded to the second function; a replacing module 830 configured to replace a first dynamic link library of the first application including the first function based on a second dynamic link library of the second application including the second function; and an updating module 840 configured to update the first process based on the second dynamic link library, such that the updated first process runs the second function in the second application.

According to an embodiment of the present disclosure, the updating module 840 includes: an address mapping acquiring module configured to acquire address mapping of the first process, the address mapping including a first address of the first function in an address space of the first process; an address updating module configured to update the first address of the first function in the address mapping using a second address of the second function in the address space; and a restarting module configured to restart the first thread, such that the restarted first thread invokes the second function in the second dynamic link library based on the updated address mapping.

According to an embodiment of the present disclosure, the apparatus further includes an address acquiring module configured to acquire the first address of the first function in the address space.

According to an embodiment of the present disclosure, the address acquiring module further includes: a function name acquiring module configured to acquire, for a given address of a group of addresses included in the first executable file of the first application, a function name associated with the given address is acquired; and an identifying module configured to identify, in response to determining that the function name matching the first function, the given address as the first address.

According to an embodiment of the present disclosure, the apparatus further includes: an eliminating module configured to eliminate, in response to determining the first thread being restarted, a part of the first executable file from a memory of a computing device running the first application, the part of the first executable file being loaded into the memory to determine the first address.

According to an embodiment of the present disclosure, the address updating module further includes: a loading module configured to load the second dynamic link library into the address space; and an address acquiring module configured to acquire the second address of the second function in the address space based on the loaded second dynamic link library.

According to an embodiment of the present disclosure, the apparatus further includes: a first link library processing module configured to acquire, for a third function except for the first function in the first dynamic link library, a third address of the third function in the address space; and a second link library processing module configured to acquire a fourth address of a fourth function corresponding to the third function in the second dynamic link library in the address space.

According to an embodiment of the present disclosure, the updating module 840 is further configured to update the third address in the address mapping using the fourth address.

According to an embodiment of the present disclosure, the updating module 840 further includes: a first variable determining module configured to determine a first variable associated with the first dynamic link library, an address of the first variable being allocated during compilation of the first application; and a second variable determining module configured to determine a second variable corresponding to the first variable in the second application; and a variable setting module configured to set the second variable based on a numerical value of the first variable.

According to an embodiment of the present disclosure, the variable setting module includes: a registering module configured to add a first registration document and a second registration document to the first dynamic link library and the second dynamic link library respectively, the numerical value of the first variable included in the first registration document being dynamically updated during running of the first thread; a synchronizing module configured to synchronize the second registration document based on the first registration document; and a variable updating module configured to update a numerical value of the second variable based on the second registration document.

According to an embodiment of the present disclosure, the variable updating module includes: a reading module configured to cause the restarted first thread to read the numerical value of the second variable from the second registration document.

According to an embodiment of the present disclosure, the first application and the second application are generated by dynamic compilation respectively.

According to an embodiment of the present disclosure, the first dynamic link library and the second dynamic link library include core service logics of the first application and the second application respectively.

Figure 9:
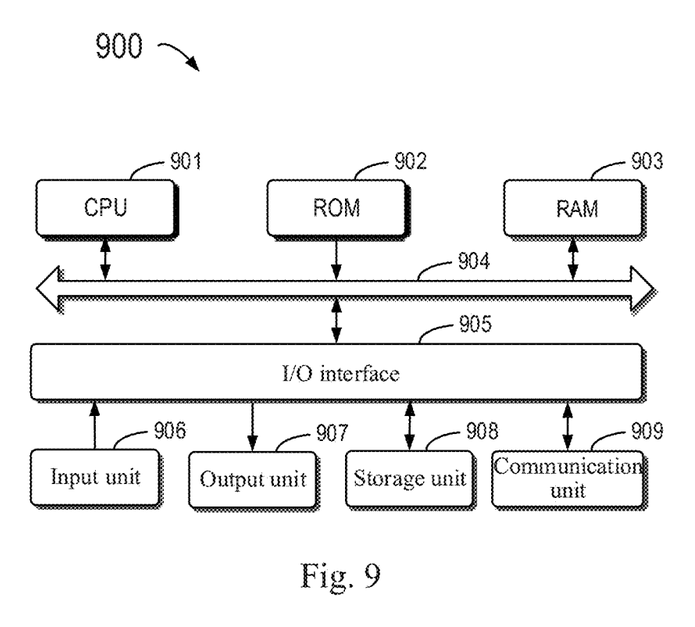
FIG. 9 shows a block diagram of a computing device capable of implementing various embodiments of the present disclosure.

FIG. 9 shows a schematic block diagram of a computing device 900 capable of implementing various embodiments of the present disclosure. The device 900 may be used to implement the method described in FIG. 3. As shown in the figure, the device 900 includes a central processing unit (CPU) 901 that may perform various appropriate actions and processing in accordance with computer program instructions stored in a read only memory (ROM) 902 or computer program instructions loaded into a random access memory (RAM) 903 from a storage unit 908. In the RAM 903, various programs and data required for the operation of the device 900 may also be stored. The CPU 901, the ROM 902, and the RAM 903 are connected to each other through a bus 904. An input/output (I/O) interface 905 is also coupled to the bus 904.

A plurality of components in the device 900 are coupled to the I/O interface 905, including: an input unit 906, such as a keyboard or a mouse; an output unit 907, such as various types of displays, or speakers; the storage unit 908, such as a disk or an optical disk; and a communication unit 909 such as a network card, a modem, or a wireless communication transceiver. The communication unit 909 allows the device 900 to exchange information/data with other devices over a computer network such as the Internet and/or various telecommunication networks.

The processing unit 901 performs the various methods and processes described above, such as the method 300. For example, in some embodiments, the method 300 may be implemented as a computer software program that is tangibly embodied in a machine readable medium, such as the storage unit 908. In some embodiments, some or all of the computer programs may be loaded and/or installed onto the device 900 via the ROM 902 and/or the communication unit 909. When a computer program is loaded into the RAM 903 and executed by the CPU 901, one or more of the steps of the method 300 described above may be performed. Alternatively, in other embodiments, the CPU 901 may be configured to perform the method 300 by any other suitable means (e.g., by means of firmware).

An embodiment of the present disclosure provides a computer readable storage medium storing a computer program thereon, where the program, when executed by a processor, implements the method according to an embodiment of the present disclosure.

The functions described herein above may be performed, at least in part, by one or more hardware logic components. For example, and without limitation, types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various operations are described in a specific order, this should not be understood that such operations are required to be performed in the specific order shown or in sequential order, or all illustrated operations should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although embodiments of the present disclosure are described in language specific to structural features and/or method logic actions, it should be understood that the subject matter defined in the appended claims is not limited to the specific features or actions described above. Instead, the specific features and actions described above are merely examples of implementing the claims.

What is claimed is:

1. A method for upgrading an application, comprising:
   determining, for a first thread executed by a first process of a first application, a first function invoked by the first thread;
   determining a second function corresponding to the first function in a second application, the first application to be upgraded to the second application, and the first function to be upgraded to the second function;
   replacing a first dynamic link library of the first application comprising the first function based on a second dynamic link library of the second application comprising the second function;
   adding a first registration document and a second registration document to the first dynamic link library and the second dynamic link library respectively, a numerical value of a first variable included in the first registration document being dynamically updated during execution of the first thread; and
   updating the first process based on the second dynamic link library, such that the updated first process runs the second function in the second application.

2. The method according to claim 1, wherein the updating the first process based on the second dynamic link library comprises:
   acquiring address mapping of the first process, the address mapping comprising a first address of the first function in an address space of the first process;
   updating the first address of the first function in the address mapping using a second address of the second function in the address space; and
   restarting the first thread, such that the restarted first thread invokes the second function in the second dynamic link library based on the updated address mapping.

3. The method according to claim 2, wherein the method further comprises acquiring the first address of the first function in the address space, the acquiring comprising:
   for a given address of a group of addresses comprised in a first executable file of the first application,
   acquiring a function name associated with the given address; and
   identifying the given address as the first address, in response to determining the function name matching the first function.

4. The method according to claim 3, wherein the method further comprises:
   eliminating, in response to determining the first thread being restarted, a part of the first executable file from a memory of a computing device running the first application, the part of the first executable file being loaded into the memory to determine the first address.

5. The method according to claim 2, wherein the method further comprises:
   loading the second dynamic link library into the address space; and
   acquiring the second address of the second function in the address space based on the loaded second dynamic link library.

6. The method according to claim 1, wherein the method further comprises:
   for a third function except for the first function in the first dynamic link library, acquiring a third address of the third function in the address space;
   acquiring a fourth address of a fourth function corresponding to the third function in the second dynamic link library in the address space; and
   updating the third address in the address mapping using the fourth address.

7. The method according to claim 2, wherein the updating the first process based on the second dynamic link library comprises:
   determining the first variable associated with the first dynamic link library, an address of the first variable being allocated during compilation of the first application;
   determining a second variable corresponding to the first variable in the second application; and
   setting the second variable based on the numerical value of the first variable.

8. The method according to claim 7, wherein the setting the second variable based on the numerical value of the first variable comprises:
   synchronizing the second registration document based on the first registration document; and
   updating a numerical value of the second variable based on the second registration document.

9. The method according to claim 8, wherein the updating a numerical value of the second variable based on the second registration document comprises:
   causing the restarted first thread to read the numerical value of the second variable from the second registration document.

10. The method according to claim 1, wherein the first application and the second application are generated by dynamic compilation respectively; and
    the first dynamic link library and the second dynamic link library comprise core service logics of the first application and the second application respectively.

11. An apparatus for upgrading an application, comprising:
    at least one processor; and
    a memory storing instructions, the instructions when executed by the at least one processor, causing the at least one processor to perform operations, the operations comprising:
    determining, for a first thread executed by a first process of a first application, a first function invoked by the first thread;
    determining a second function corresponding to the first function in a second application, the first application to be upgraded to the second application, and the first function to be upgraded to the second function;
    replacing a first dynamic link library of the first application comprising the first function based on a second dynamic link library of the second application comprising the second function;
    adding a first registration document and a second registration document to the first dynamic link library and the second dynamic link library respectively, a numerical value of a first variable included in the first registration document being dynamically updated during execution of the first thread; and updating the first process based on the second dynamic link library, such that the updated first process runs the second function in the second application.

12. The apparatus according to claim 11, wherein the updating the first process based on the second dynamic link library comprises:
acquiring address mapping of the first process, the address mapping comprising a first address of the first function in an address space of the first process;
updating the first address of the first function in the address mapping using a second address of the second function in the address space; and
restarting the first thread, such that the restarted first thread invokes the second function in the second dynamic link library based on the updated address mapping.

13. The apparatus according to claim 12, wherein the operations further comprise acquiring the first address of the first function in the address space, the acquiring comprising:
acquiring, for a given address of a group of addresses comprised in a first executable file of the first application, a function name associated with the given address; and
identifying the given address as the first address, in response to determining the function name matching the first function.

14. The apparatus according to claim 13, wherein the operations further comprise:
eliminating, in response to determining the first thread being restarted, a part of the first executable file from a memory of a computing device running the first application, the part of the first executable file being loaded into the memory to determine the first address.

15. The apparatus according to claim 12, wherein the operations further comprise:
loading the second dynamic link library into the address space; and
acquiring the second address of the second function in the address space based on the loaded second dynamic link library.

16. The apparatus according to claim 11, wherein the operations further comprise:
acquiring, for a third function except for the first function in the first dynamic link library, a third address of the third function in the address space;
acquiring a fourth address of a fourth function corresponding to the third function in the second dynamic link library in the address space; and
updating the third address in the address mapping using the fourth address.

17. The apparatus according to claim 12, wherein the operations further comprise:

determining the first variable associated with the first dynamic link library, an address of the first variable being allocated during compilation of the first application;
determining a second variable corresponding to the first variable in the second application; and
setting the second variable based on the numerical value of the first variable.

18. The apparatus according to claim 17, wherein the setting the second variable based on a-the numerical value of the first variable comprises:
synchronizing the second registration document based on the first registration document; and
updating a numerical value of the second variable based on the second registration document.

19. The apparatus according to claim 18, wherein the updating a numerical value of the second variable based on the second registration document comprises:
causing the restarted first thread to read the numerical value of the second variable from the second registration document.

20. The apparatus according to claim 11, wherein
the first application and the second application are generated by dynamic compilation respectively; and
the first dynamic link library and the second dynamic link library comprise core service logics of the first application and the second application respectively.

21. A non-transitory computer readable storage medium, storing a computer program thereon, wherein the program, when executed by a processor, causes the processor to perform operations, the operations comprising:
determining, for a first thread executed by a first process of a first application, a first function invoked by the first thread;
determining a second function corresponding to the first function in a second application, the first application to be upgraded to the second application, and the first function to be upgraded to the second function;
replacing a first dynamic link library of the first application comprising the first function based on a second dynamic link library of the second application comprising the second function;
adding a first registration document and a second registration document to the first dynamic link library and the second dynamic link library respectively, a numerical value of a first variable included in the first registration document being dynamically updated during execution of the first thread; and
updating the first process based on the second dynamic link library, such that the updated first process runs the second function in the second application.

* * * * *

UNITED STATES PATENT AND TRADEMARK OFFICE
CERTIFICATE OF CORRECTION

| | |
|---|---|
| PATENT NO. | : 11,281,445 B2 |
| APPLICATION NO. | : 16/710511 |
| DATED | : March 22, 2022 |
| INVENTOR(S) | : Linsi Yuan |

It is certified that error appears in the above-identified patent and that said Letters Patent is hereby corrected as shown below:

In the Claims

Column 18, Line 10, Claim 18, delete "a-the" and insert -- the --.

Signed and Sealed this
Twenty-third Day of August, 2022

Katherine Kelly Vidal
*Director of the United States Patent and Trademark Office*